United States Patent
Kramer et al.

(10) Patent No.: US 10,335,869 B2
(45) Date of Patent: Jul. 2, 2019

(54) DEVICE FOR MACHINING A PLANAR WORKPIECE AND CORRESPONDING METHOD

(71) Applicant: KIESLING MASCHINENTECHNIK GMBH, Dietzenbach (DE)

(72) Inventors: Tim Kramer, Solms (DE); Matthias Kienholz, Biebertal (DE)

(73) Assignee: Rittal GmbH & Co. KG (DE)

( * ) Notice: Subject to any disclaimer, the term of this patent is extended or adjusted under 35 U.S.C. 154(b) by 0 days.

(21) Appl. No.: 15/528,982

(22) PCT Filed: Nov. 4, 2015

(86) PCT No.: PCT/DE2015/100465
§ 371 (c)(1),
(2) Date: May 23, 2017

(87) PCT Pub. No.: WO2016/082820
PCT Pub. Date: Jun. 2, 2016

(65) Prior Publication Data
US 2017/0266737 A1    Sep. 21, 2017

(30) Foreign Application Priority Data
Nov. 24, 2014 (DE) .......... 10 2014 117 128

(51) Int. Cl.
*B26D 7/20* (2006.01)
*B23C 3/13* (2006.01)
(Continued)

(52) U.S. Cl.
CPC .............. *B23C 3/13* (2013.01); *B23Q 1/032* (2013.01); *B23Q 11/0032* (2013.01); *B26D 7/02* (2013.01);
(Continued)

(58) Field of Classification Search
CPC ........... B26D 7/20; B23Q 1/032; B23Q 1/035
See application file for complete search history.

(56) References Cited

U.S. PATENT DOCUMENTS 3,735,660 A * 5/1973 Pearl ................. B26F 1/382
83/374
3,765,289 A * 10/1973 Gerber ............ A41H 43/0292
269/21
(Continued)

FOREIGN PATENT DOCUMENTS

DE    8805081 U1    7/1988
DE    4335363 A1    4/1995
(Continued)

OTHER PUBLICATIONS

Report (in German) from the German Patent and Trademark Office regarding EP Patent Application 10 2014 117 128.4 dated Sep. 22, 2015 (6 pages).
(Continued)

*Primary Examiner* — Daniel W Howell
(74) *Attorney, Agent, or Firm* — Harness, Dickey & Pierce, PLC (57) ABSTRACT

The invention relates to a device for machining a flat workpiece, which comprises: a machine stand which comprises a support surface for a flat workpiece, wherein the support surface is formed by at least one counterholder, on the front face of which the workpiece can be placed, a hold-down unit, by means of which the workpiece is pressed against the support surface, and a processing head which can be moved relative to the support surface for the machining of the workpiece, wherein the at least one counterholder comprises a vibration damper which acts in a direction perpendicular to the support surface.

11 Claims, 5 Drawing Sheets

(51) Int. Cl.
    *B23Q 1/03* (2006.01)
    *B23Q 11/00* (2006.01)
    *B26D 7/02* (2006.01)

(52) U.S. Cl.
    CPC ............ *B26D 7/20* (2013.01); *B23C 2250/16* (2013.01); *B23Q 2240/002* (2013.01)

(56) References Cited

U.S. PATENT DOCUMENTS

| | | | |
|---|---|---|---|
| 3,942,411 A | 3/1976 | Gerber | |
| 3,942,781 A | 3/1976 | Gerber | |
| 4,205,835 A * | 6/1980 | Gerber | A41H 15/00 269/21 |
| 4,685,363 A * | 8/1987 | Gerber | B26D 7/015 269/21 |
| 4,749,314 A * | 6/1988 | LeBlond | B23B 41/00 408/130 |
| 5,065,469 A * | 11/1991 | Takken | B08B 7/02 134/32 |
| 5,180,049 A | 1/1993 | Salvagnini | |
| 5,317,943 A * | 6/1994 | Dowdle | B23Q 11/0042 409/132 |
| 5,358,226 A * | 10/1994 | Arikita | B26D 7/20 269/21 |
| 5,494,269 A | 2/1996 | McCalmont | |
| 6,190,297 B1 * | 2/2001 | Croft | B26D 7/20 493/353 |
| 6,540,456 B2 * | 4/2003 | Conley | B23C 3/00 408/67 |
| 2010/0019432 A1 * | 1/2010 | Zahnd | B32B 37/0046 269/296 |
| 2012/0207562 A1 | 8/2012 | Piggott et al. | |

FOREIGN PATENT DOCUMENTS

| | | | |
|---|---|---|---|
| DE | 10011754 A1 | 9/2001 | |
| DE | 10241399 A1 * | 3/2003 | ............ B23Q 1/032 |
| DE | 10330528 B4 | 8/2006 | |
| DE | 102008014358 A1 | 10/2009 | |
| EP | 0338132 A2 * | 10/1989 | ............ B23Q 1/032 |
| EP | 0482702 A1 | 4/1992 | |

OTHER PUBLICATIONS

International Search Report (in English and German) and Written Opinion (in German) issued in PCT/DE2015/100465, dated Mar. 4, 2016; ISA/EP.

* cited by examiner

DEVICE FOR MACHINING A PLANAR WORKPIECE AND CORRESPONDING METHOD

CROSS-REFERENCE TO RELATED APPLICATIONS

This application is a 371 U.S. National Stage of International Application No. PCT/DE2015/100465, filed on Nov. 4, 2015, which claims priority to German Application No. 10 2014 117 128.4 filed on Nov. 24, 2014. The entire disclosures of the above applications are incorporated herein by reference.

FIELD

The disclosure relates to a device for machining a flat workpiece and to a corresponding method, in particular for producing mounting plates as used for electrical switching installations, in particular for the arrangement of switching cabinet fixtures.

BACKGROUND

This section provides background information related to the present disclosure which is not necessarily prior art.

The device according to the preamble comprises a machine stand which comprises a support surface for a flat workpiece, wherein the support surface is formed by at least one counterholder, on the front face of which the workpiece can be placed. The device moreover comprises a hold-down unit, by means of which the tool is pressed against the support surface, as well as a processing head which can moved relative to the support surface for the machining of the workpiece.

From DE 100 11 754 A1, a device for low-vibration clamping of flat workpieces on a machining apparatus is known. The machining apparatus comprises a machine stand with a support surface for the tool, which extends preferably substantially vertically, as well as with a bridge with a processing head, which can be moved relative to the support surface for the machining of the workpiece. On the bridge, at least one hold-down unit is attached, which is used to press the workpiece as it is being processed against the support surface which is formed by a plurality of support bolts connected by plug connection to the machine stand and preferably made of plastic, which are distributed according to a predetermined arrangement on the machine stand. In order to prevent vibrations which can be generated when a tool, for example, a milling cutter, is moved through the workpiece, it is proposed that the hold-down unit moreover comprises a pressing device with a spring element which prestresses a pressing arm in the direction of the support surface.

In the device known from DE 100 11 754 A1, the workpiece is thus placed on columnar support bolts which form counterholders and against which the flat workpiece is braced by means of the hold-down unit. It was observed that, in spite of the spring elements in the hold-down units, the workpiece can vibrate strongly when the tool, for example, a shank rough milling cutter, is passed through the workpiece. These vibrations decrease the cutting performance and the useful life of the tool. In addition, they cause considerable noise emission.

SUMMARY

This section provides a general summary of the disclosure, and is not a comprehensive disclosure of its full scope or all of its features.

Therefore, it is the aim of the disclosure to provide a device according to the preamble and a corresponding method, in which the vibration of the flat workpiece during the processing is effectively suppressed.

Accordingly, the inventive device is characterized in that at least one counterholder comprises a vibration damper which acts in a direction perpendicular to the support surface. It has been found that the vibration suppression can be achieved particularly effectively in that the damping element, which is to prevent vibration of the workpiece during the processing, is shifted onto the counterholder which forms the support surface on which the workpiece is placed. Several of these counterholders can be arranged over the entire support face of the workpiece, distributed over on the machine stand, and they therefore provide a large-area vibration damping.

Instead of rigid counterholders which are made exclusively of a solid plastic or the like, as known from DE 100 11 754 A1, according to the disclosure, the counterholders should comprise a vibration damper. The vibration damper can be formed, for example, from a resilient material, which is deformable to an extent such that, during the processing, the flat workpiece always remains in contact with at least one counterholder and preferably with a plurality of counterholders, so that vibration of the flat workpiece can be suppressed effectively.

In order to ensure contact between the flat workpiece and the at least one counterholder during the processing of the workpiece, it is provided, in an embodiment of the disclosure, that the vibration damper is prestressed via a pressing force which is provided by the hold-down unit and/or by at least one component of the force of gravity of the workpiece, which acts perpendicularly to the support surface.

The solid, columnar counterholders known from the prior art moreover have the disadvantage that they always have to be arranged with respect to the flat workpiece in such a manner that the position thereof does not lie in the processing path of the tool. If the tool is, for example, a milling cutter, then, when the milling cutter collides with such a counterholder, the processing of the workpiece can be interrupted, and, under some circumstances, the tool can also be damaged or even destroyed. In an embodiment of the disclosure, it is therefore provided that the vibration damper of the counterholder is formed on the front face of the counterholder and can be passed through by a tool, in particular a milling cutter, for the machining of the workpiece, without destroying the tool. For that purpose, the vibration damper can comprise at least one passage channel extending parallel to the support surface, for the tool for the machining of the workpiece.

In another embodiment of the disclosure, the vibration damper comprises a material which can be subjected to the processing, with formation of a passage channel, by the tool for the machining of the workpiece at a feed speed at which the processing head is moved over the workpiece, without destruction of the tool. The material is not limited to certain materials as long as it is ensured that the material properties, particularly the material strength, make it possible for the tool to remain essentially undamaged when it strikes the material at the feed speed at which the processing head is moved over the workpiece and works itself through the material. The material can be a polystyrene, for example. These materials are cost effective, so that the vibration damper can optionally be replaced after the tool has been passed through multiple times, if it has been worn off to the extent that it is no longer sufficiently functioning with regard to the vibration damping property thereof.

In another embodiment of the disclosure, the vibration damper comprises at least one brush element with a plurality of bristles, wherein the ends of the bristles of the brush element form the front face of the counterholder. In particular, the bristles can be resilient plastic bristles. Preferably, the bristles have substantially the same length, so that they form, by means of the ends thereof, a uniform support surface for the workpiece. The rigidity of the bristles can here be selected just so that, given an expected workpiece weight which, in the case of flat workpieces, is substantially precisely proportional to the workpiece area, the bristles are prestressed via the weight of the workpiece or due to the pressing pressure with which the workpiece is pressed via the hold-down unit against the support surface, so that, during the processing of the workpiece, there is always a contact between the brush element and the workpiece, and thus the generation of vibrations is effectively suppressed.

The brush element preferably comprises at least one brush strip having a length that is substantially greater than a width perpendicular to the length, wherein the bristles extend perpendicularly to the length and to the width. Thus, for example, it is conceivable that the device comprises a plurality of parallel spaced apart brush strips, onto which the workpiece is placed.

In order to also enable the processing of flat workpieces that have interfering contours on the side with which they are placed on the bristle strips, for example, folded edges, a tubular door frame or the like, which can collide with the brush strip, it is provided, in an embodiment of the disclosure, that the brush strip is segmented in the longitudinal direction thereof, in particular that it comprises several bristle strip portions, which are spaced apart by a gap in longitudinal direction of the brush strip. The gap between the brush strip portions is then to be arranged exactly so that the respective interfering contour of the workpiece extends in the area of the gap.

In order to keep the effective cross section between the tool, in particular, a milling cutter, and the brush strip as small as possible, it is provided, in an embodiment of the disclosure, that the brush strip is arranged with respect to an expected feed direction of the processing head in such a manner that the tool is moved through the brush strip substantially perpendicularly to the length, therefore in the direction of the width, wherein the brush strip can precisely be much longer than it is broad. When the tool strikes the brush strip, brushes located in the path of propagation of the tool are displaced, so that a passage channel for the tool through the brush strip forms, which can then close again in the feed direction behind the tool due to the resilience of the bristles.

In another embodiment of the disclosure, the brush element comprises a holding rail, on which the at least one brush strip is fastened replaceably, wherein the holding rail is fastened directly or via a plurality of spacers on the machine stand, in particular, by screw connection. This enables the use of commercial brush strips, which, when used with an also commercial holding rail, can form the brush element, so that, in this embodiment, entirely simple and cost effective means can be used. The holding rail can be, for example, a rail produced by the extrusion process or a profiled rail, for example, a U-profile.

Preferably, the holding rail here comprises an undercut recess extending in longitudinal direction of the holding rail for the mounting of the brush strip, wherein the holding rail comprises at least one opening in one of the longitudinal ends thereof, through which the bristle strip can be inserted into the recess.

In a particular embodiment of the disclosure, the holding rail is used not only for the mounting of the at least one brush strip, but, in addition, also for the fastening of the hold-down unit, wherein the holding rail comprises a mounting recess extending in the longitudinal direction thereof, along which the hold-down unit is slidably inserted. As a result, it is possible that, depending on the dimensions of the workpiece to be processed, the hold-down unit can be arranged along the holding rail in such a manner that it can engage in the marginal area of the workpiece and press said workpiece against the support surface formed by the brush strips. The hold-down unit can be, for example, a lever clamp which can be fixed via a slot nut in the holding rail in a desired position.

Here, it is preferable that the holding rail is a hollow profile having an open longitudinal side through which the mounting recess is accessible and which is limited by two parallel flanges that are spaced apart and extend perpendicularly to the support surface, and on the free longitudinal edge of which a respective brush strip is fastened. In this manner, the hold-down unit can be arranged precisely between the two brush strips, so that, when the hold-down unit is actuated, the two brush strips are evenly loaded.

The device according to the disclosure enables a method for machining a flat workpiece, which allows passage through at least one counterholder, so that, in contrast to the devices known from the prior art, the counterholders no longer have to be arranged so as to prevent a collision of the tool with the counterholder. Therefore, the method according to the disclosure comprises the steps of:

placement of a flat workpiece on a support surface, formed by at least one counterholder, of a device for machining a flat workpiece, wherein the at least one counterholder comprises a vibration damper which acts in a direction perpendicular to the support surface, pressing of the workpiece against the support surface, and guiding of a processing head, which can be moved relative to the support surface for the machining of the workpiece, over the workpiece, wherein the method is precisely characterized in that, during the guiding of the processing head, at least one counterholder is passed through by a tool of the processing head.

The method here can include that the counterholder is passed through by a milling cutter, with formation of a milling track in a vibration damper of the counterholder. Alternatively, the counterholder can include a vibration damper which comprises a brush element, the bristle ends of which form the support surface for the workpiece, wherein the bristles in the path passed through by the tool are displaced when the tool passes through the brush strip.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE PREFERRED EMBODIMENTS

Figure 1:
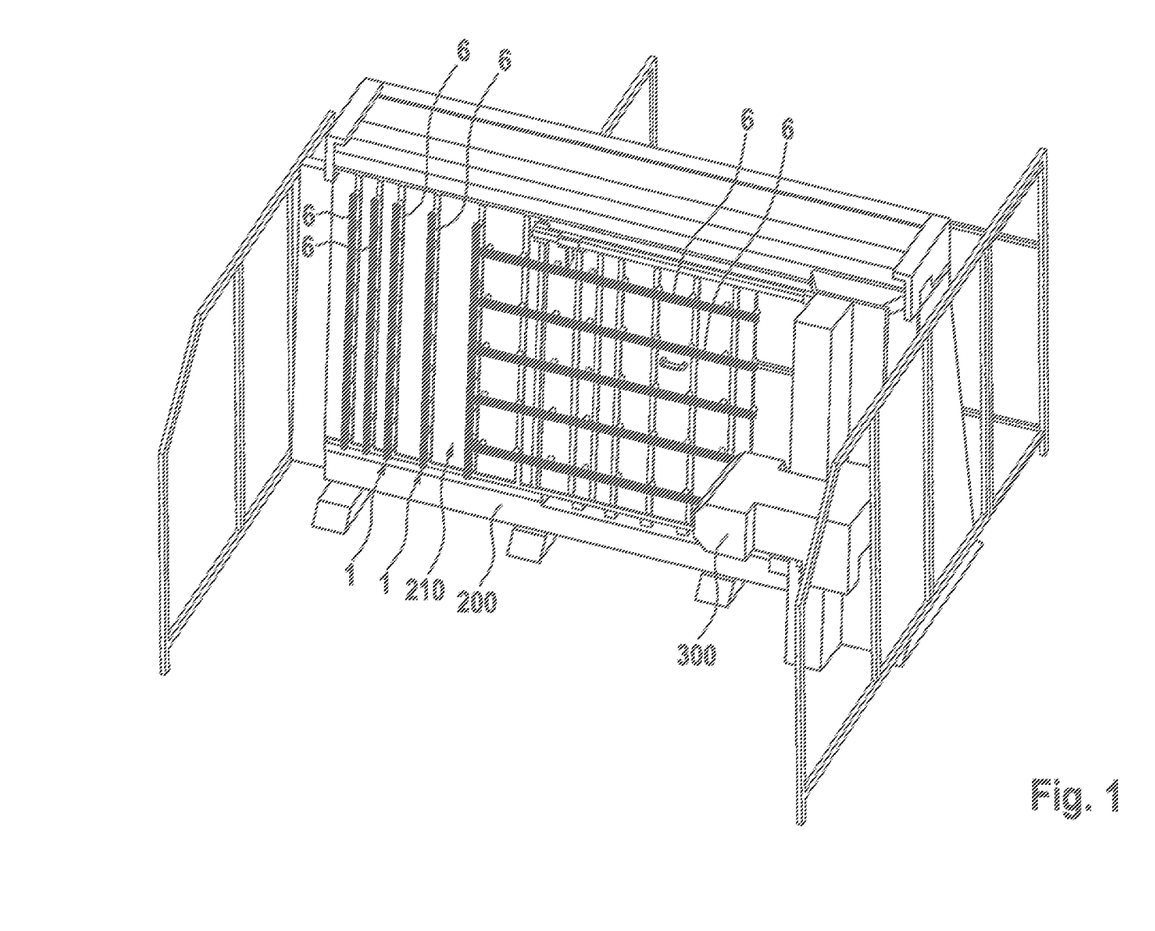
FIG. 1 shows an embodiment of the inventive device.
Figure 2:
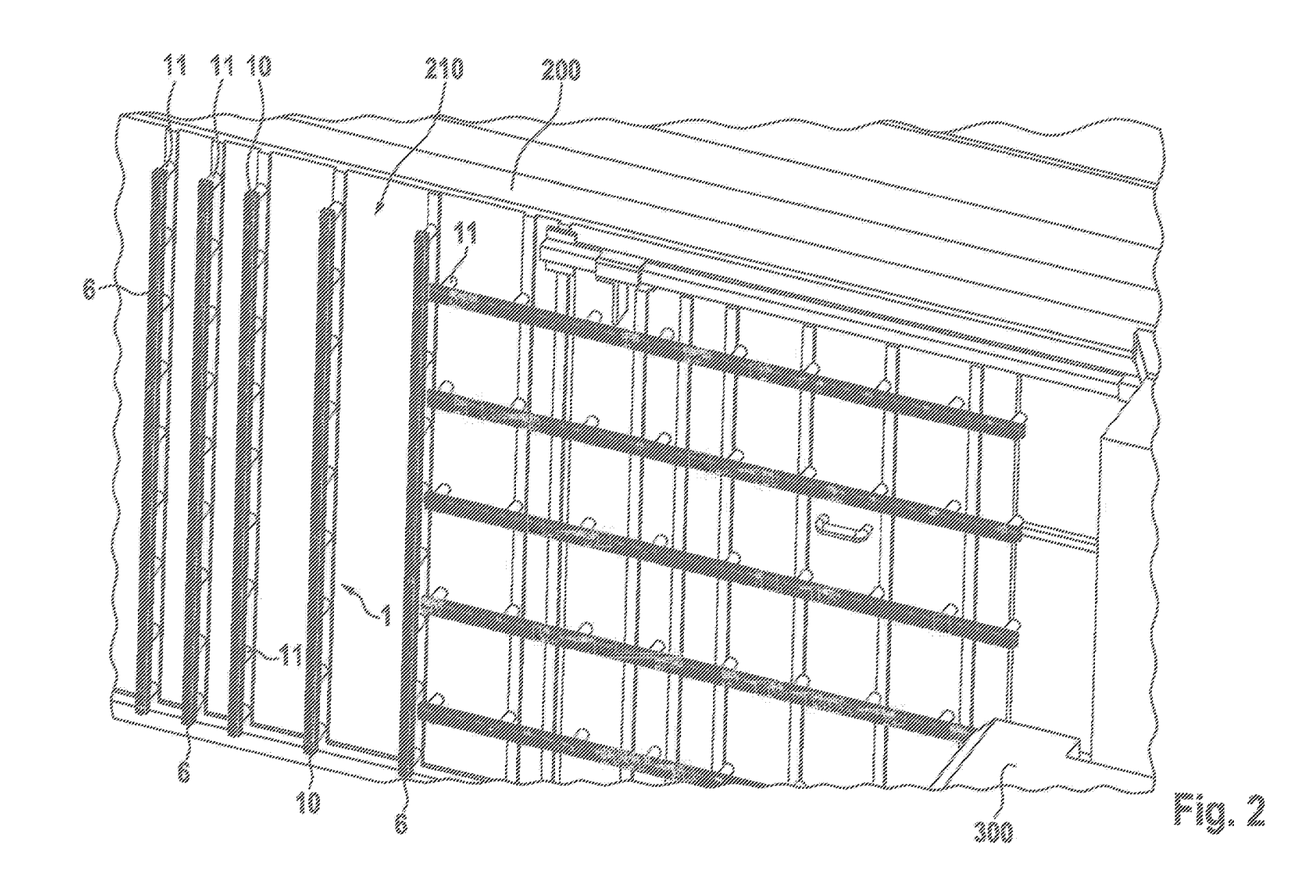
FIG. 2 shows an enlarged detail of the support face of the device according to FIG. 1.
Figure 3:
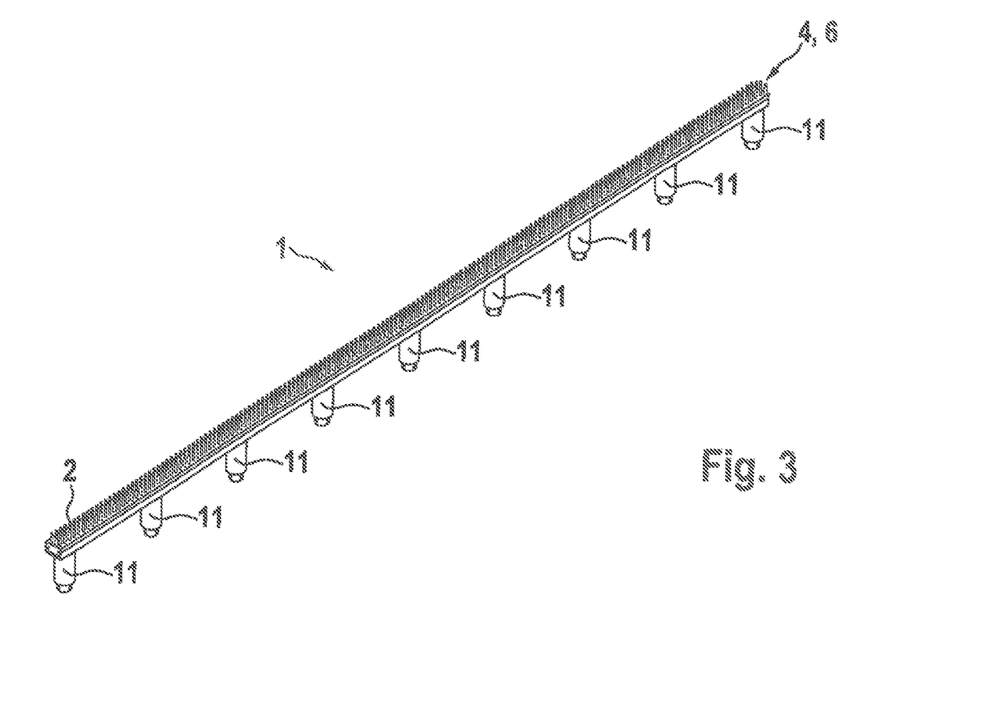
FIG. 3 shows an embodiment of the inventive counterholder in a perspective representation.

FIGS. 1 and 2 show an overall view of an inventive device for the machining of a flat workpiece, in particular of a mounting plate for the interior fixtures of a switching cabinet, as well as a detail view of the support surface 210. The device comprises a machine stand 200, which forms a support surface 210 for a workpiece (not shown). This support surface 210 is formed by counterholders 1 comprising brush elements 6. The counterholders 1 comprise a holding rail 10, which comprises a brush element 6 that faces the support surface 210 and is formed as a brush strip. The holding rails 10 are fastened via spacers 11 to the machine stand 200. The workpiece can be placed on the parallel bristle elements 6 which are spaced apart and can be fixed, for example, in the marginal area with retaining tabs, wherein the brush elements 6 form a vibration damper which suppresses vibration of the workpiece during the processing of the workpiece. For the processing of a workpiece, a processing head 300 can be moved over the support surface 210. The processing head 300 can comprise, for example, a milling cutter for the introduction of cutouts in the mounting plate and it can be designed in manner known from DE 10 2008 014 358 A1. However, the processing head 300 is not limited to such embodiments.

The counterholder 1 represented in FIGS. 3-6 consists substantially of a holding rail 10 and a brush element 6 formed as a brush strip mounted therein, which is formed as a brush strip. The brush element 6 in the process forms precisely the vibration damper 4. The holding rail 10 can be mounted via a plurality of equidistant spacers on a machine stand of a machining apparatus as known from DE 100 11 754 A1, for example.

Figure 4:
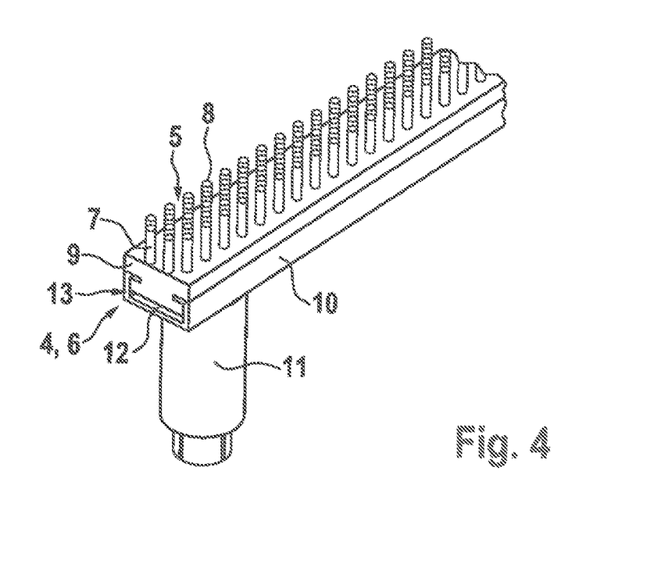
FIG. 4 shows an enlarged detail of the front face of the counterholder according to FIG. 3 in a perspective representation.
Figures 5, 6:
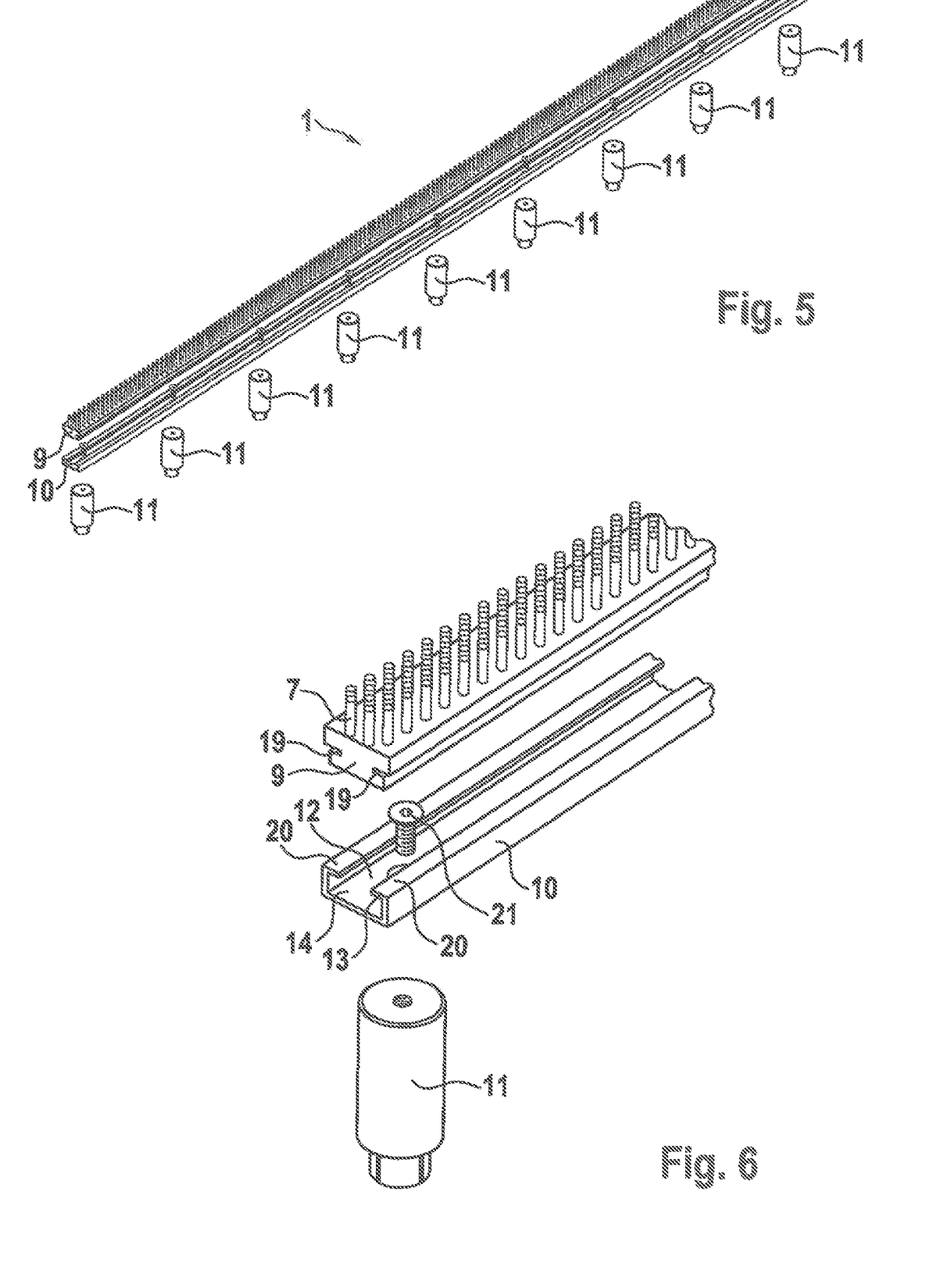
FIG. 5 shows the counterholder according to FIG. 3 in an exploded perspective representation.
FIG. 6 shows an enlarged detail of the front face of the counterholder according to FIG. 5 in an exploded perspective representation.

As can be seen in FIG. 4, the holding rail 10 comprises an undercut recess 12, which extends in the longitudinal direction of the holding rail 10 and by means of which the brush element 6 formed as brush strip 9 is held. For the mounting of the brush strip 9, the holding rail 10 has an opening 14 on the longitudinal end 13 thereof, through which the brush strip 9 can be slid onto the holding rail 10. For this purpose, the respective brush strip 9 comprises, on facing sides, a groove 19 in which two facing flanges 20 of the holding rail 10, which limit the recess 12, engage and in this manner fix the brush strip 9 in the state in which it is slid onto the holding rail 10. The holding rail 10 is connected via bolts 21 to the spacers 11 (see FIG. 6).

Moreover, FIG. 4 shows that the bristles 7 of the brush strip 9 are arranged equidistantly and form passage channels 5 between adjacent bristles 7. The bristles 7 can be made of a resilient plastic. When, in this way, a tool, for example, a milling cutter, strikes the brush strip 9, then precisely the bristles 7 located in the feed direction of the tool are displaced, without in the process being excessively damaged by the milling cutter. If, after multiple uses, wear occurs on the brush strip 9, the latter can be replaced easily by pulling the strip from the rail 10 through the opening 14 out of the recess 12 and replacing it with a new brush strip 9.

The bristles 7 have substantially precisely the same length, wherein the free ends 8 thereof form the support surface for the workpiece. The resilience of the bristles 7 is adjusted so that, due to the weight of the workpiece itself and/or due to the prestressing force with which the tool is pressed against the bristles 7 due to the hold-down unit, the bristles 7 are prestressed to such an extent that, during the workpiece processing procedure, a vibration-preventing contact is maintained at all times between the bristles 7 and the workpiece.

Figure 7:
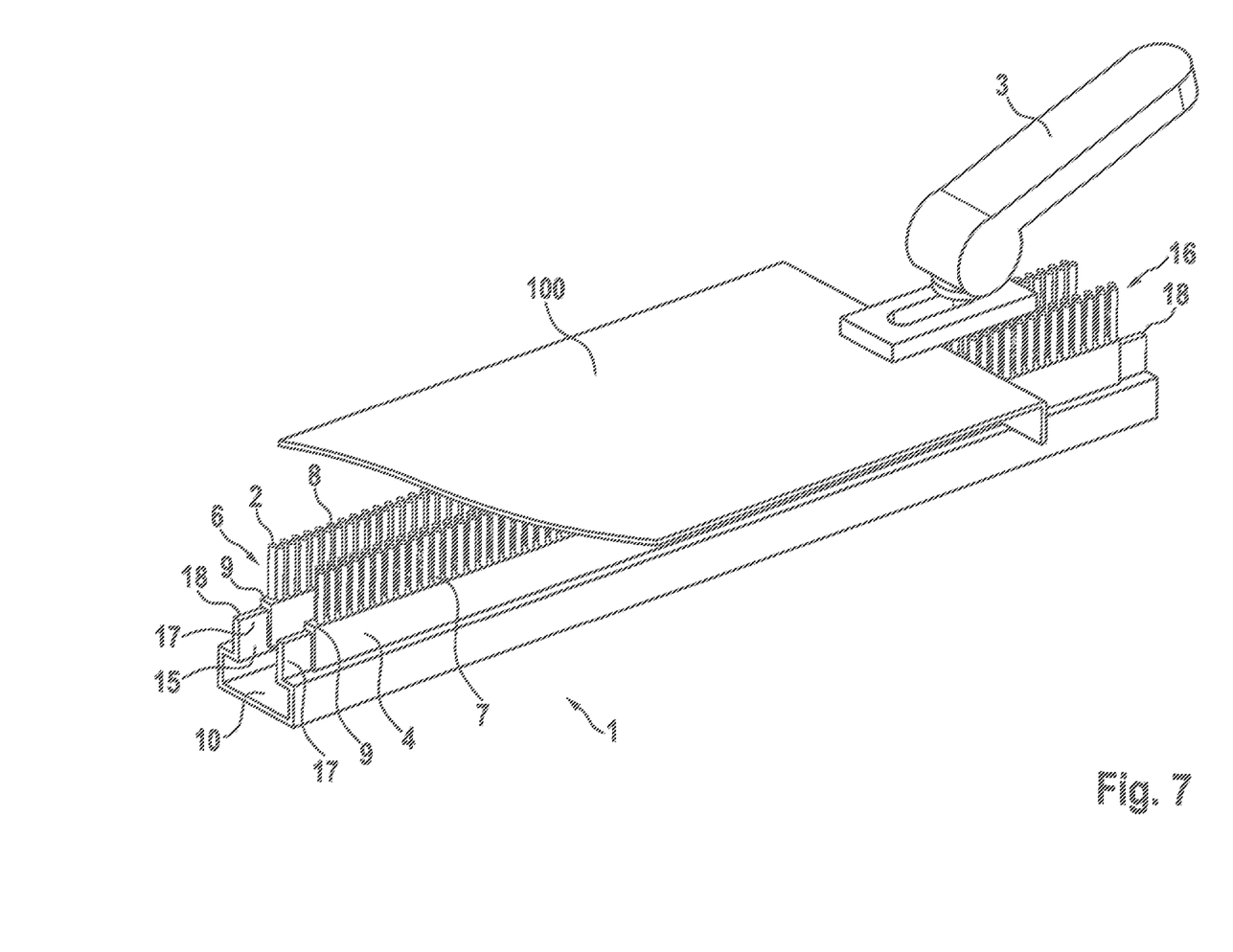
FIG. 7 shows a second embodiment of the inventive counterholder with clamped on workpiece.

FIG. 7 shows an embodiment of the inventive counterholder 1, in which a hold-down unit 3, which is designed here as a lever clamp, is slidably inserted in a mounting recess 15 extending in the longitudinal direction of the holding rail 10. In this manner, it is possible to arrange the hold-down unit 3 with respect to the holding rail 10 precisely in such a manner that the hold-down unit 3 can engage on the workpiece 100 in the marginal area of the workpiece 100.

The holding rail 10 is formed as a hollow profile which has an open longitudinal side 16 through which the mounting recess 15 is accessible. The mounting recess 15 is limited by two parallel flanges 17 which are spaced apart and extend perpendicularly to the support surface, and on the free longitudinal edge 18 of which a respective brush strip 9 is fastened, for example, plugged in. In this embodiment as well, the brush strips 9 can easily be replaced in the case of wear.

The features of the disclosure disclosed in the above description, in the drawing and in the claims can be essential, both individually and also in any combination, for the implementation of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for machining a flat workpiece, which comprises:
    a machine stand which includes a support surface for a flat workpiece, wherein the support surface has at least one counterholder which serves as a vibration damper which acts in a direction perpendicular to the support surface, the counterholder having at least one brush element with a plurality of bristles, wherein ends of the bristles of the brush element form the front face of the counterholder on which the workpiece can be placed,
    a hold-down unit for pressing the workpiece against the support surface, and
    a processing head which can be moved relative to the support surface for the machining of the workpiece,
    wherein the brush element is formed by at least one brush strip having a length that is substantially greater than a width perpendicular to the length, wherein the bristles extend perpendicularly to the length and to the width;
    a holding rail on the machine stand; and
    the hold-down unit being arranged on the holding rail.

2. The device according to claim 1, wherein the vibration damper is prestressed via a clamping force which is provided by the hold-down unit and/or by at least one component of the force of gravity of the workpiece, which acts perpendicularly to the support surface.

3. The device according to claim 1, wherein the vibration damper of the counterholder is formed on the front face of the counterholder and can be passed through by a tool for the machining of the workpiece, without destruction of the tool.

4. The device according to claim 3, wherein the vibration damper comprises at least one passage channel extending parallel to the support surface, for a tool for the machining of the workpiece.

5. The device according to claim 3, wherein the vibration damper comprises a material which can be subjected to the processing, with formation of a passage channel, by the tool for the machining of the workpiece at a feed speed at which the processing head is moved over the workpiece, without destruction of the tool.

6. The device according to claim 1, wherein the brush strip is segmented in the longitudinal direction thereof, and includes several brush strip portions which are spaced apart from one another by a gap in the longitudinal direction of the brush strip.

7. The device according to claim 1, wherein the brush strip is arranged with respect to an expected feed direction of the processing head in such a manner that the brush strip can be passed through by the tool substantially perpendicularly to the length.

8. The device according to claim 1, wherein the brush element is fastened replaceably on the holding rail, and wherein the holding rail is fastened directly or via a plurality of spacers on the machine stand.

9. The device according to claim 8, wherein the holding rail comprises an undercut recess extending in the longitudinal direction of the holding rail for the mounting of the brush strip, wherein the holding rail comprises, on at least one of the longitudinal ends thereof, an opening through which the bristle strip can be inserted into the recess.

10. The device according to claim 8, wherein the holding rail comprises a mounting recess extending in the longitudinal direction thereof, along which the hold-down unit is slidably inserted.

11. The device according to claim 10, wherein the holding rail is a hollow profile which has an open longitudinal side, through which the mounting recess is accessible and which is limited by two parallel flanges which are spaced apart and extend perpendicularly to the support surface, and on the free longitudinal edge of which a respective brush strip is fastened.

* * * * *